March 20, 1956 W. L. WILSON 2,738,993
FLEXIBLE TUBE COUPLINGS
Filed Jan. 19, 1953
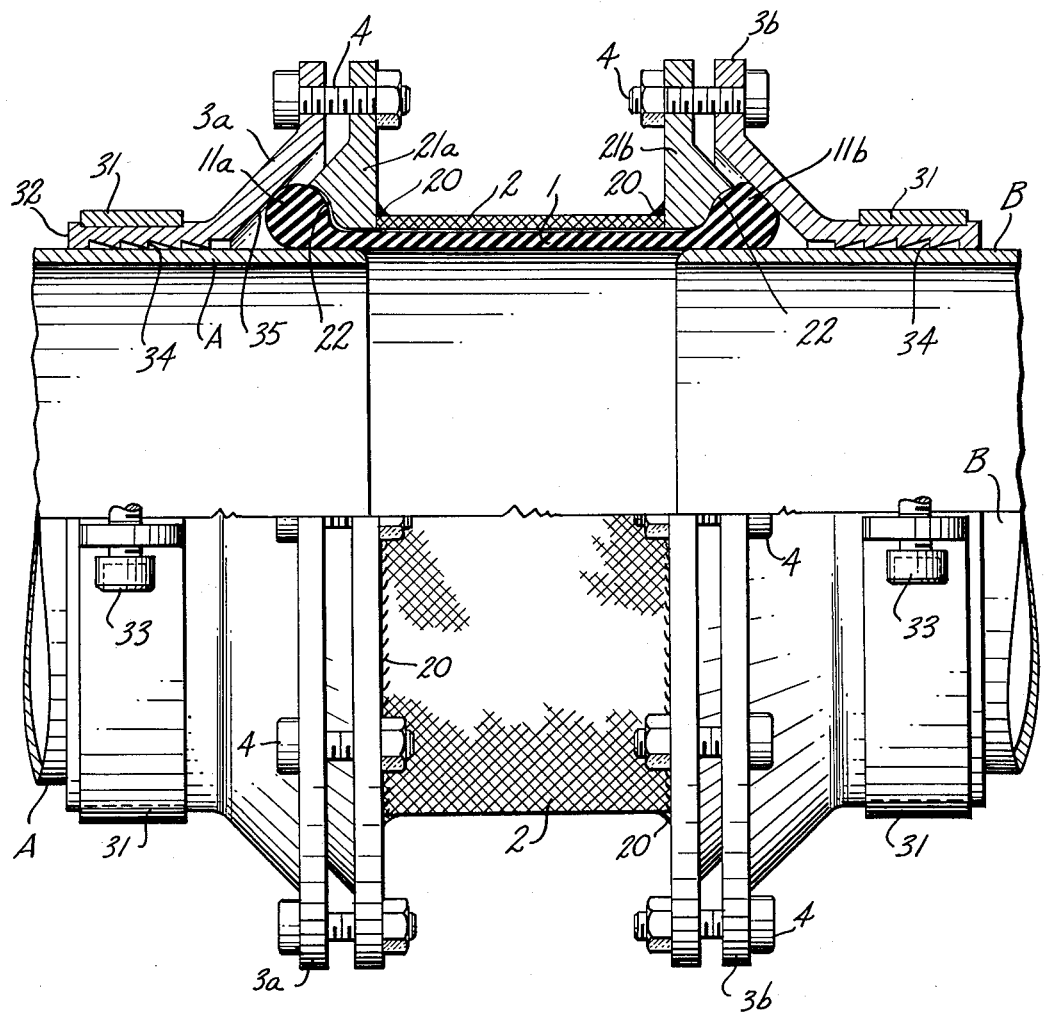
INVENTOR.
WAYNE L. WILSON
BY
Reynolds, Beach & Christensen
ATTORNEYS United States Patent Office 2,738,993
Patented Mar. 20, 1956

2,738,993

FLEXIBLE TUBE COUPLINGS

Wayne L. Wilson, Alderwood Manor, Wash., assignor to Boeing Airplane Company, Seattle, Wash., a corporation of Delaware Application January 19, 1953, Serial No. 332,012

5 Claims. (Cl. 285—90)

In aircraft structure in particular, and in other installations, it is required to connect two spaced-apart tube ends, such as may carry fuel, for example, in locations or under conditions where the coupling between the tube ends must resist appreciable internal pressures, while it is subjected to extremes of temperature, to vibration, and where it may not be feasible to align the tube ends precisely, and yet under all such conditions, it is necessary that the coupling maintain tight connections at each tube end, that it be readily connectable and disconnectable when required, that it be simple and relatively inexpensive, and that it maintain a secure joint under all the varying conditions which it may encounter in service. The provision of a flexible tube coupling to the ends indicated is the object of this invention.

The invention is illustrated in the accompanying drawing in a form such as is presently preferred by me, and the principles of the present invention will become apparent as this specification, including the claims, progresses.

In the drawing the coupling is shown partly in section and partly in elevation, in a presently preferred arrangement.

The tube ends A and B, which are to be connected, are not necessarily perfectly axially aligned, and the invention will form a secure coupling between them even though they are not. They may be, for example, axially offset but otherwise aligned, or they may be disposed at somewhat of an angle relative to one another, or both. The tubes illustrated are of large size, for the invention is capable of functioning in such a situation, or the tubes may be appreciably smaller. Their ends should be initially spaced apart by an appreciable distance.

Extending from one tube end to the other is an inner sleeve 1 formed of a material such as rubber, neoprene, or other such material, hereinafter generically termed "rubber composition," which is impervious to the liquid being conducted through the tubes, and resistant to chemical or physical attack by such liquid, and which will reasonably exhibit these properties, and be resistant to structural break-down, under wide temperature ranges. Rubber compositions having such properties are known, but sleeves of such rubber compositions would also normally be but little resistant to radial expansion under pressure. Heretofore the solution for such a problem has been to encase the rubber sleeve within a metal tube, which greatly restricts its vibrational and thermal expansive and contractive movement, or within a bellows-like metal sleeve, which is weak under expansive pressure, and introduces undesirable undulations in the walls of the conduit as a whole.

Herein each such sleeve is formed at its opposite ends with a resiliently deformable bead, the two being designated 11a and 11b, to distinguish the corresponding ends of the sleeve. These beads embrace closely the corresponding tube ends A and B, respectively.

Closely encircling and embracing each such inner sleeve 1 is an outer sleeve 2. This outer sleeve, in distinction to the solid sleeves, or the accordion-folded or relatively telescoping sleeves heretofore used, is of a material which is inherently axially extensible and contractable, but which, whether contracted or expanded axially, is always smooth, and is highly resistant to radial expansion. Moreover, it does not materially contract radially as it expands axially. An appropriate material has been found to be braided metal in tubular form, quite similar to that used for sheathing of electrical wires. This outer sleeve 2 is of somewhat shorter length than the inner sleeve 1, but extends, with its terminal flanges, which will shortly be described, substantially between the beads 11a and 11b.

Terminal flanges 21a and 21b, respectively, are integrally secured to the respective ends of the outer sleeve 2, and the use of braided metal makes possible its securement to the terminal flanges by means of welding indicated at 20. This weld joint will suffice since it is not exposed to stresses such as would rupture it. The terminal flanges 21a and 21b engage and partially house in the inner side of the corresponding beads 11a and 11b, being preferably formed at their bead-engaging faces with recesses, indicated at 22, of such shape as to partially encircle and receive the corresponding beads yet leaving a portion of the bead's outer face protruding at all times.

Anchoring flanges 3a and 3b are provided, paired with the corresponding terminal flanges, and each for securement upon the end of the corresponding tube A or B. These anchoring flanges may be mounted upon the tube in any convenient or preferred manner, as, for example, by the clamping bands 31, which can be constricted about the base sleeve 32 of the anchoring flanges by means of the constricting bolts 33, or in any suitable manner, and interiorly the sleeves 32 may be formed, as indicated at 34, to bite into the metal of the encircled tube end, and to resist axial thrust in the sense tending to pull them off the ends of the tubes. Each such anchoring flange should be mounted upon its tube in such position that it will engage the outer side of the bead 11a or 11b, and of course the axial stretchability of the inner and outer sleeves 1 and 2, respectively, will readily allow minor adjustability once the anchoring flanges have been properly located and secured. Preferably, also, each anchoring flange is inclined or otherwise shaped, as indicated at 35, in such manner that when the paired flanges 3a and 21a, or 3b and 21b, are drawn toward one another, the bead 11 will be resiliently deformed and pressed primarily inwardly all around the corresponding tube, to form a tight seal. Such urging together of the paired flanges such as 3a and 21a is accomplished by means such as the clamping bolts 4, spaced about the respective flanges in known manner.

Ordinarily the anchoring flanges 3a and 3b would be secured in place upon the respective tube ends and an inner sleeve 1 would be chosen of correct diameter and proper length to span the gap between the tube ends A and B and to enable the beads 11a and 11b to engage the respective anchoring flanges. An outer sleeve 2 with its terminal flanges 21a and 21b would accompany such an inner sleeve, and once the inner sleeve had been installed with its beads embracing the respective tube ends, the coupling is completed by drawing tight the clamping bolts 4 to deform inwardly the beads 11a and 11b. Such a deformed bead is illustrated at the right in the figure, and at the left the bead is in its natural undeformed shape.

A coupling of this nature, installed as described, will permit separation of the tube ends and their approach under changing thermal conditions, their transverse movement under the influence of vibration, and is itself inherently tight under widely varying temperature conditions, having been tested through a temperature range from −65° F. to +135° F. It will resist radial expansion caused by axial loads such as result from pressure within the tube. It is of particular value at low temperature, always maintaining a tight seal, and when the inner rubber composition sleeve 1 is formed of proper material, such as is resistant to low temperatures, of which a number are known, it is adequately flexible under such low temperature conditions, notwithstanding that it may at the time be stretched by the thermal contraction of the tubes A and B.

The braided metal outer sleeve 2 functions additionally to bond together all parts of a fuel conduit, for harmless grounding of static electrical charges.

I claim as my invention:

1. An expansible coupling for use in joining two spaced-apart tube ends, comprising an inner sleeve of a length in excess of the gap between such tube ends, formed of an impervious, resiliently stretchable material, an enlarged bead of resiliently deformable material formed integrally upon each end thereof, in position and of a size to embrace the corresponding tube end, an outer sleeve of material which is axially elongatable and retractible, but resistant to radial expansion, of a size to closely embrace the inner sleeve, and to extend substantially from one bead to the other, a terminal flange outstanding from and integral with each end of the outer sleeve, and engaging the corresponding bead at the side thereof nearer the opposite bead, an anchoring flange for securement to each tube, facing the corresponding terminal flange to constitute a pair, and engaging the opposite side of the bead which is engaged by such terminal flange, and means to urge together the two flanges of each such pair, the bead-engaging surfaces of both such paired flanges being divergent inwardly from their point of nearest approach, to urge the beads cooperatively inwardly to press all about the embraced tubes.

2. A coupling as in claim 1, wherein the outer sleeve is formed of braided metal.

3. A coupling as in claim 1, wherein the outer sleeve is formed of braided metal, and the terminal flanges are likewise of metal, the flanges being joined to the respective ends of the outer sleeve by a weld.

4. A coupling as in claim 1, wherein each terminal flange is formed, on its bead-engaging face, with a recess of a size and shape to receive the bead, but to leave a portion of the bead projecting towards the paired terminal flange, and wherein said terminal flange's bead-contacting face is inclined to urge the bead inwardly when the paired flanges are urged together.

5. A coupling for use in joining two spaced-apart tube ends fluid-tightly in a manner to afford a limited degree of misalignment and relative movement between them, which coupling comprises an inner and an outer sleeve, the inner sleeve being formed of a rubber composition, of an internal diameter substantially equal to the external diameter of the tube ends and of a length to embrace the respective tube ends substantially without becoming expanded, an integral deformable bead formed upon and outstanding from the respectively opposite ends of said inner sleeve, the outer sleeve being formed of braided metal closely embracing the inner sleeve, between the beads, a terminal flange integrally connected to the braided outer sleeve at each end thereof, and located and recessed to receive snugly the axially inner side and part of the radially outer circumference of the corresponding bead, leaving the axially outer side and a part of the radially outer circumference of the bead protruding, an anchoring flange for securement to each tube end, in position axially outwardly of and facing the corresponding terminal flange, each anchoring flange being shaped at its face adjacent the terminal flange to engage the protruding portion of the interposed bead and to crowd the latter axially and radially inwardly against the terminal flange and the tube end, respectively, and means interconnecting each such terminal flange and the corresponding anchoring flange, to draw them axially together and so to crowd the intervening bead in the manner described.

References Cited in the file of this patent

UNITED STATES PATENTS

| | | |
|---|---|---|
| 568,996 | Totham | Oct. 6, 1896 |
| 2,516,631 | Jacobson | July 25, 1950 |

FOREIGN PATENTS

| | | |
|---|---|---|
| 15,239 | Great Britain | Aug. 27, 1900 |
| 323,352 | Great Britain | Jan. 2, 1930 |